United States Patent
Kim

(10) Patent No.: US 11,760,228 B2
(45) Date of Patent: Sep. 19, 2023

(54) ELECTRIC POWER AND THERMAL MANAGEMENT SYSTEM

(71) Applicants: Hyundai Motor Company, Seoul (KR); Kia Corporation, Seoul (KR)

(72) Inventor: Gwi Taek Kim, Chungcheongnam-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/880,178

(22) Filed: Aug. 3, 2022

(65) Prior Publication Data

US 2022/0379773 A1   Dec. 1, 2022

Related U.S. Application Data

(63) Continuation-in-part of application No. 17/479,545, filed on Sep. 20, 2021.

(30) Foreign Application Priority Data

May 11, 2021 (KR) .......................... 10-2021-0060932
Oct. 8, 2021 (KR) .......................... 10-2021-0134380

(51) Int. Cl.
*F04B 1/146* (2020.01)
*B60L 58/26* (2019.01)
(Continued)

(52) U.S. Cl.
CPC ................. *B60L 58/26* (2019.02); *B60K 1/04* (2013.01); *B60L 58/33* (2019.02); *F04B 1/124* (2013.01);
(Continued)

(58) Field of Classification Search
CPC .......... B60L 58/26; B60L 58/33; B60L 58/12; B60L 50/40; B60L 50/75; B60K 1/04;
(Continued)

(56) References Cited

U.S. PATENT DOCUMENTS 1,842,569 A * 1/1932 Richer .................... F04B 1/146
91/507
1,935,921 A * 11/1933 Schwitzer ............. F04D 29/063
384/393
(Continued)

FOREIGN PATENT DOCUMENTS

CN          104775901 A  *  7/2015
CN          112901438 A  *  6/2021
(Continued)

OTHER PUBLICATIONS

JP_2003232277_A_I English Machine Translation (Year: 2003).*
(Continued)

*Primary Examiner* — J. Todd Newton
*Assistant Examiner* — Wayne A Lambert
(74) *Attorney, Agent, or Firm* — Fox Rothschild LLP

(57) ABSTRACT

Disclosed herein is an electric power and thermal management system in which, when a shaft is rotated due to an operation of a power part, generation of electric power and a circulation of a fluid are performed together so that the generation of the electric power and a circulation structure of oil are integrated, and thus a layout can be reduced, and a structure can be simplified. In addition, in a state in which the generation of the electric power and the circulation structure of the oil are integrated, a circulation amount of the oil is adjusted according to an angle of an inclined plate constituting a pumping mechanism so that an oversupply of the oil to parts through which the oil is circulated can be prevented.

14 Claims, 7 Drawing Sheets

(51) Int. Cl.

| | | |
|---|---|---|
| B60K 1/04 | (2019.01) | |
| F04B 17/03 | (2006.01) | |
| F04B 1/124 | (2020.01) | |
| H01M 16/00 | (2006.01) | |
| H01M 8/04858 | (2016.01) | |
| H01M 8/04029 | (2016.01) | |
| H01M 8/04746 | (2016.01) | |
| H01M 10/44 | (2006.01) | |
| H01M 10/613 | (2014.01) | |
| H01M 10/625 | (2014.01) | |
| H01M 10/63 | (2014.01) | |
| H01G 11/18 | (2013.01) | |
| H01G 11/78 | (2013.01) | |
| B60L 58/33 | (2019.01) | |
| B60K 1/00 | (2006.01) | |

(52) U.S. Cl.
CPC .......... *F04B 1/146* (2013.01); *F04B 17/03* (2013.01); *H01G 11/18* (2013.01); *H01G 11/78* (2013.01); *H01M 8/04029* (2013.01); *H01M 8/0494* (2013.01); *H01M 8/04768* (2013.01); *H01M 10/44* (2013.01); *H01M 10/613* (2015.04); *H01M 10/625* (2015.04); *H01M 10/63* (2015.04); *H01M 16/006* (2013.01); *B60K 2001/005* (2013.01); *H01M 2220/20* (2013.01)

(58) Field of Classification Search
CPC .... B60K 2001/005; F04B 1/124; F04B 1/146; F04B 17/03; F04B 1/128; F04B 17/05; F04B 9/02; F04B 53/08; F04B 53/18; H01G 11/18; H01G 11/78; H01G 11/08; H01M 8/04029; H01M 8/04768; H01M 8/0494; H01M 10/44; H01M 10/613; H01M 10/625; H01M 10/63; H01M 16/006; H01M 2220/20
See application file for complete search history.

(56) References Cited

U.S. PATENT DOCUMENTS

| | | | | |
|---|---|---|---|---|
| 2,381,056 A | * | 8/1945 | Huber | F04B 1/124 417/269 |
| 2,385,990 A | * | 10/1945 | Huber | F04B 1/145 417/269 |
| 3,663,122 A | * | 5/1972 | Kitchen | F04B 1/14 91/472 |
| 3,806,066 A | | 4/1974 | Eickmann | |
| 4,729,717 A | * | 3/1988 | Gupta | F04B 1/22 417/410.1 |
| 4,738,589 A | | 4/1988 | Wright | |
| 4,784,045 A | * | 11/1988 | Terauchi | F04B 27/1063 417/269 |
| 4,838,765 A | * | 6/1989 | Wusthof | F04B 1/18 417/269 |
| 5,220,225 A | * | 6/1993 | Moon, Jr. | F04B 23/106 310/87 |
| 5,591,013 A | | 1/1997 | Kawafune et al. | |
| 5,877,577 A | * | 3/1999 | Ishizaki | F04B 49/002 417/271 |
| 5,927,073 A | * | 7/1999 | Ishizaki | H02K 7/14 60/487 |
| 6,254,357 B1 | * | 7/2001 | Lynn | F04B 49/007 417/539 |
| 6,565,329 B2 | * | 5/2003 | Yokomachi | F04B 27/1036 417/372 |
| 6,792,844 B1 | | 9/2004 | Gedge et al. | |
| 7,014,428 B2 | * | 3/2006 | Pitla | F04B 27/1804 184/26 |
| 7,168,997 B2 | * | 1/2007 | Ohtsuki | B63H 23/08 440/5 |
| 7,182,583 B2 | * | 2/2007 | Gandrud | F04B 1/14 417/32 |
| 8,358,042 B2 | * | 1/2013 | Yamada | F03C 1/0607 310/82 |
| 9,000,602 B2 | * | 4/2015 | Yamada | F03C 1/0623 290/1 R |
| 9,991,764 B2 | | 6/2018 | Kim | |
| 10,465,679 B2 | | 11/2019 | Hansen | |
| 2001/0048251 A1 | * | 12/2001 | Ieoka | H02K 7/14 310/49.01 |
| 2003/0068239 A1 | * | 4/2003 | Suzuki | F04B 53/08 417/366 |
| 2007/0053780 A1 | * | 3/2007 | Ruffner | F04B 1/14 417/410.1 |
| 2015/0064030 A1 | * | 3/2015 | Suzuki | F04B 17/03 417/372 |
| 2018/0346132 A1 | | 12/2018 | Casado-Montero et al. | |
| 2020/0149430 A1 | | 5/2020 | Cornet et al. | |
| 2022/0275800 A1 | * | 9/2022 | Bauer | F04B 49/065 |

FOREIGN PATENT DOCUMENTS

| | | | | |
|---|---|---|---|---|
| DE | 102007058534 A1 | * | 6/2009 | ............ F01P 5/04 |
| EP | 0256389 A2 | * | 2/1988 | |
| EP | 2607696 A1 | * | 6/2013 | ........... F03C 1/0623 |
| EP | 2848808 A1 | * | 3/2015 | ........... F03C 1/0636 |
| GB | 2524787 A | * | 10/2015 | ............ B60K 6/12 |
| JP | 2003232277 A | * | 8/2003 | |
| JP | 4322456 B2 | | 9/2009 | |
| JP | 2009209725 A | * | 9/2009 | ........... F03C 1/0607 |
| JP | 2021124061 A | * | 8/2021 | |
| KR | 20120061767 A | * | 6/2012 | |
| KR | 10 1501134 B1 | | 3/2015 | |
| KR | 20200072595 A | * | 6/2020 | |

OTHER PUBLICATIONS

KR_20200072595_A_I English Machine Translation (Year: 2020).*
Notice of Allowance dated Feb. 21, 2023 in U.S. Appl. No. 17/479,545.
Notice of Allowance dated Jun. 23, 2023 in U.S. Appl. No. 17/479,545.

* cited by examiner

ELECTRIC POWER AND THERMAL MANAGEMENT SYSTEM

CROSS REFERENCE TO RELATED APPLICATION

This application is a continuation-in-part of U.S. patent application Ser. No. 17/479,545, filed on Sep. 20, 2021, which claims priority to and the benefit of Korean Patent Application No. 10-2021-0060932, filed on May 11, 2021, and Korean Patent Application No. 10-2021-0134380, filed on Oct. 8, 2021, the entire contents of each of which are incorporated herein by reference.

BACKGROUND

Field of the Invention

Embodiments of the present disclosure relate to an electric power and thermal management system in which that generation of electric power and circulation of a fluid are integrated.

Description of the Related Art

With recent developments in technology, various types of mobilities have been developed to move passengers to their destinations more conveniently and quickly. That is, conventionally, a passenger, who wants to move, moves to a desired place using a private car or public transportation, but a technology for providing a movement service for passengers through autonomous driving mobility is being developed.

In addition, a delivery service using mobility is being developed. That is, in a state in which luggage is loaded on the mobility, the mobility is moved to a specific area through autonomous driving to enable luggage delivery.

In addition, the mobility may be operated not only through the autonomous driving but also through direct driving, and not only ground mobility which travels on the ground but also flying mobility, which moves in the air, is being developed.

In particular, the mobility for flight is provided with an oil circulation device for an operation of an additional device. The oil circulation device is a system which receives electric or mechanical power from an engine, generates hydraulic pressure, and then supplies the hydraulic pressure to each required element. However, an oil cooling motor has a structure in which hydraulic energy is generated from an oil pump outside a motor, and oil is forcibly sprayed onto a stator or rotor of the motor so that the oil is cooled, and the oil is separated for cooling and for the hydraulic pressure.

In addition, in the conventional case, a device for generating electric power is provided separately, and each device is independently divided. Accordingly, when devices according to oil cooling, oil lubrication, and electric power management are installed, there is a problem in that a volume and a weight of a system are increased, and the system becomes complicated.

The foregoing is intended merely to aid in understanding of the background of the present disclosure, and is not intended to mean that the present disclosure falls within the purview of the existing technologies that are already known to those skilled in the art.

SUMMARY

Embodiments of the present disclosure have been made keeping in mind the above problems occurring in the existing technologies, and the present disclosure is intended to propose an electric power and thermal management system in which generation of electric power and circulation of a fluid are integrated into one device so that the overall layout is reduced, and a structure is simplified.

According to an exemplary embodiment, there is provided an electric power and thermal management system including a housing provided with a shaft in an inner space thereof, a power part connected to the shaft and configured to transmit rotational power, a power generation part configured to generate electric power through a rotation of the shaft when the power part is driven, a pumping mechanism including an inclined plate installed at the shaft such that an inclined angle is adjusted, and a piston configured to perform a reciprocating motion due to a rotation of the inclined plate when the shaft is rotated and circulate a fluid, an electric power system part to which the electric power generated in the power generation part is supplied, and a drive system part to which the fluid circulated due to the pumping mechanism is supplied.

The housing may be partitioned into a first space in which the power part and the shaft are connected, a second space which is connected to the first space so as to control the fluid to be circulated and in which a pumping mechanism is provided, and a third space which is connected to the second space so as to control the fluid to be circulated and in which the power generation part is provided.

The housing may be further provided with a fourth space, which is partitioned to exchange heat with the third space, may be provided with electrical equipment, and may be configured to cool the electrical equipment through heat exchange between the fluid circulating in the third space and the electrical equipment.

The pumping mechanism may be configured to form a circulation path of the fluid, wherein the circulation path may include the power part, a connector of the shaft, an external heat exchanger, the drive system part, the electric power system part, and the power generation part.

The electric power and thermal management system may further include a controller configured to determine necessary electric power required in an airframe and a necessary fluid volume of the drive system part and the electric power system part and control the power part, an inclined angle of the inclined plate, and a supply of the electric power and the fluid which are transferred to the drive system part and the electric power system part according to the necessary electric power and the necessary fluid volume.

The power part may be connected to the shaft by a medium of a clutch mechanism, and the controller may be configured to control whether the clutch mechanism is engaged, control the clutch mechanism to be engaged when driving of the pumping mechanism or the power generation part is required, and control the clutch mechanism to be disengaged when the driving of the pumping mechanism or the power generation part is not required.

When a necessary fluid volume is generated in the drive system part and the electric power system part, the controller may be configured to derive the inclined angle of the inclined plate satisfying a necessary fluid volume to control the inclined plate.

The electric power system part may include a fuel cell stack, a battery, and a supercapacitor, and the controller may be configured to control the electric power generated in the power generation part and the electric power of the electric power system part to be selectively supplied to the airframe according to the necessary electric power required by the airframe.

When the necessary electric power exceeds a predetermined range, the controller may be configured to control the electric power generated by the power generation part and the electric power of the fuel cell stack, the battery, and the supercapacitor constituting the electric power system part to be supplied to the airframe.

When the necessary electric power is within the predetermined range, the controller may be configured to control the electric power of the fuel cell stack, the battery, and the supercapacitor constituting the electric power system part to be supplied to the airframe.

When the necessary electric power is less than the predetermined range, the controller may be configured to control the electric power of any one or more of the fuel cell stack, the battery, and the supercapacitor constituting the electric power system part to be supplied the airframe and control the fluid to be supplied to a moving part of the drive system part and the electric power system part.

When charging of the battery and the supercapacitor is required in the electric power system part, the controller may be configured to control the electric power generated in the power generation part to be supplied to the battery and the supercapacitor.

The controller may be configured to derive a driving amount of the power part and the inclined angle of the inclined plate according to a charging amount or a charging speed of the battery and the supercapacitor to control the inclined plate and the power part.

When fast charging of the battery and supercapacitor is required, the controller may be configured to control the electric power of the fuel cell stack constituting the electric power system part to be supplied to the battery and the supercapacitor.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Figure 1:
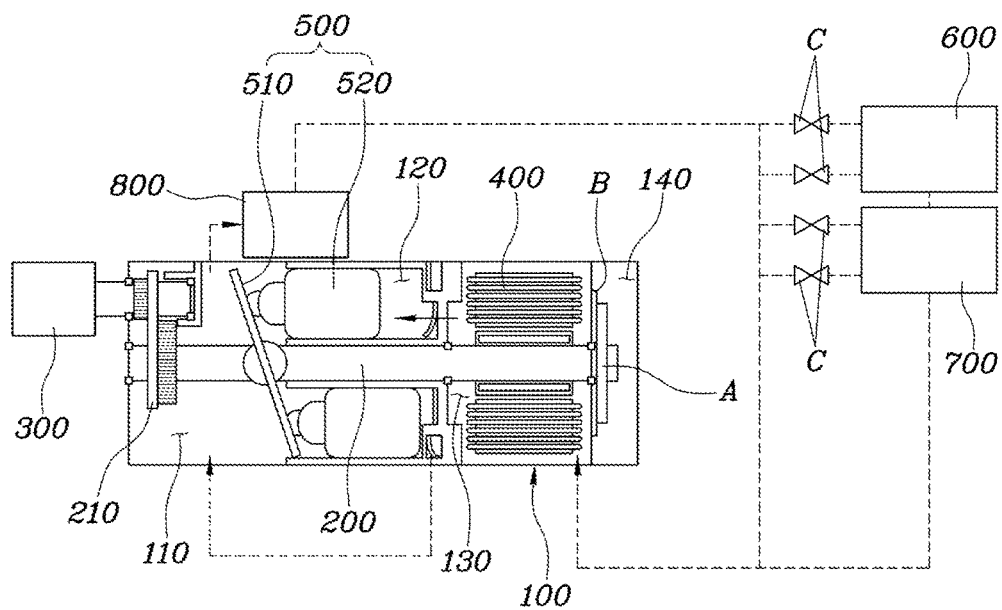
FIG. 1 is a diagram illustrating an electric power and thermal management system according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

Hereinafter, an electric power and thermal management system according to exemplary embodiments of the present disclosure will be described with reference to the accompanying drawings.

Figure 2:
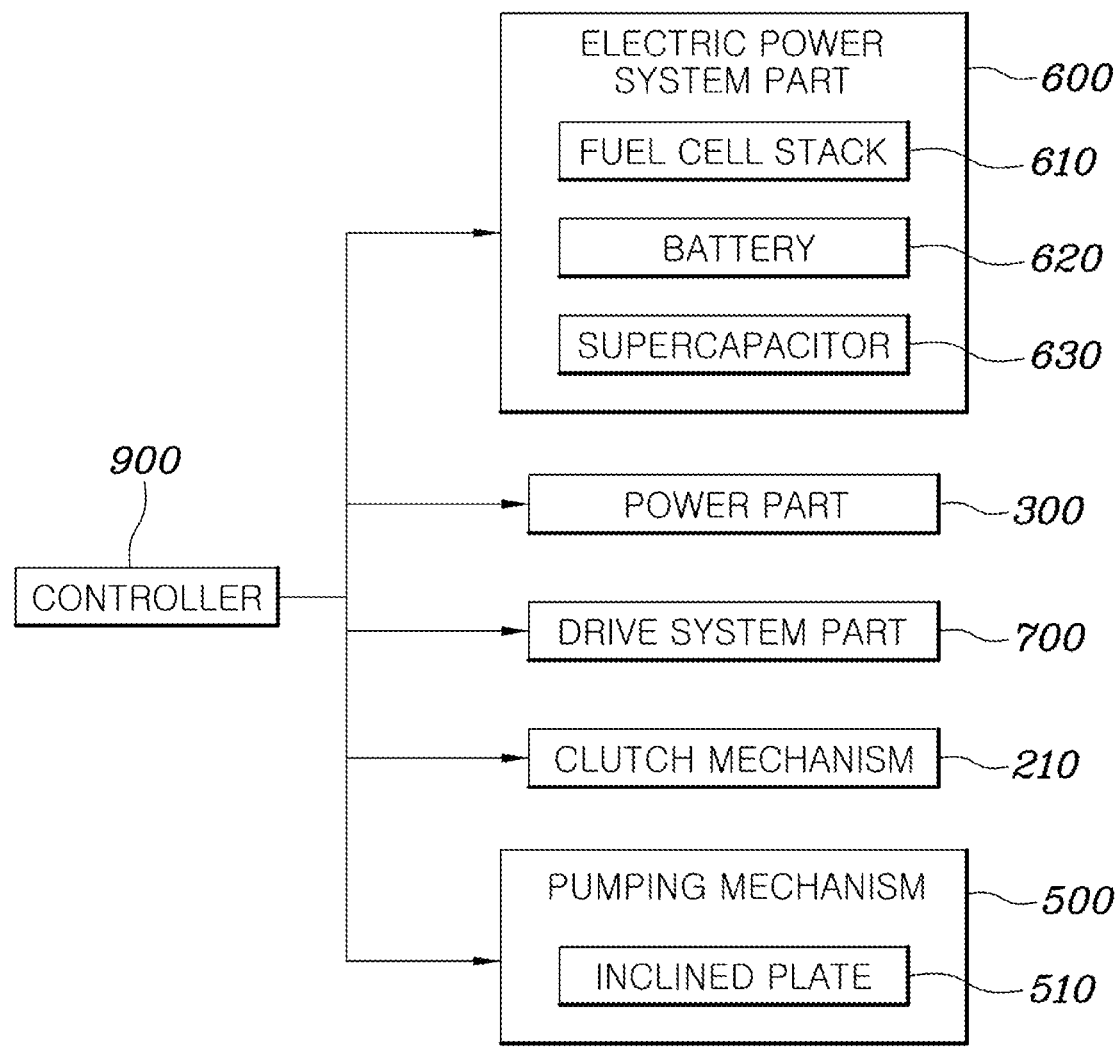
FIG. 2 is a block diagram illustrating the electric power and thermal management system shown in FIG. 1.
Figure 3:
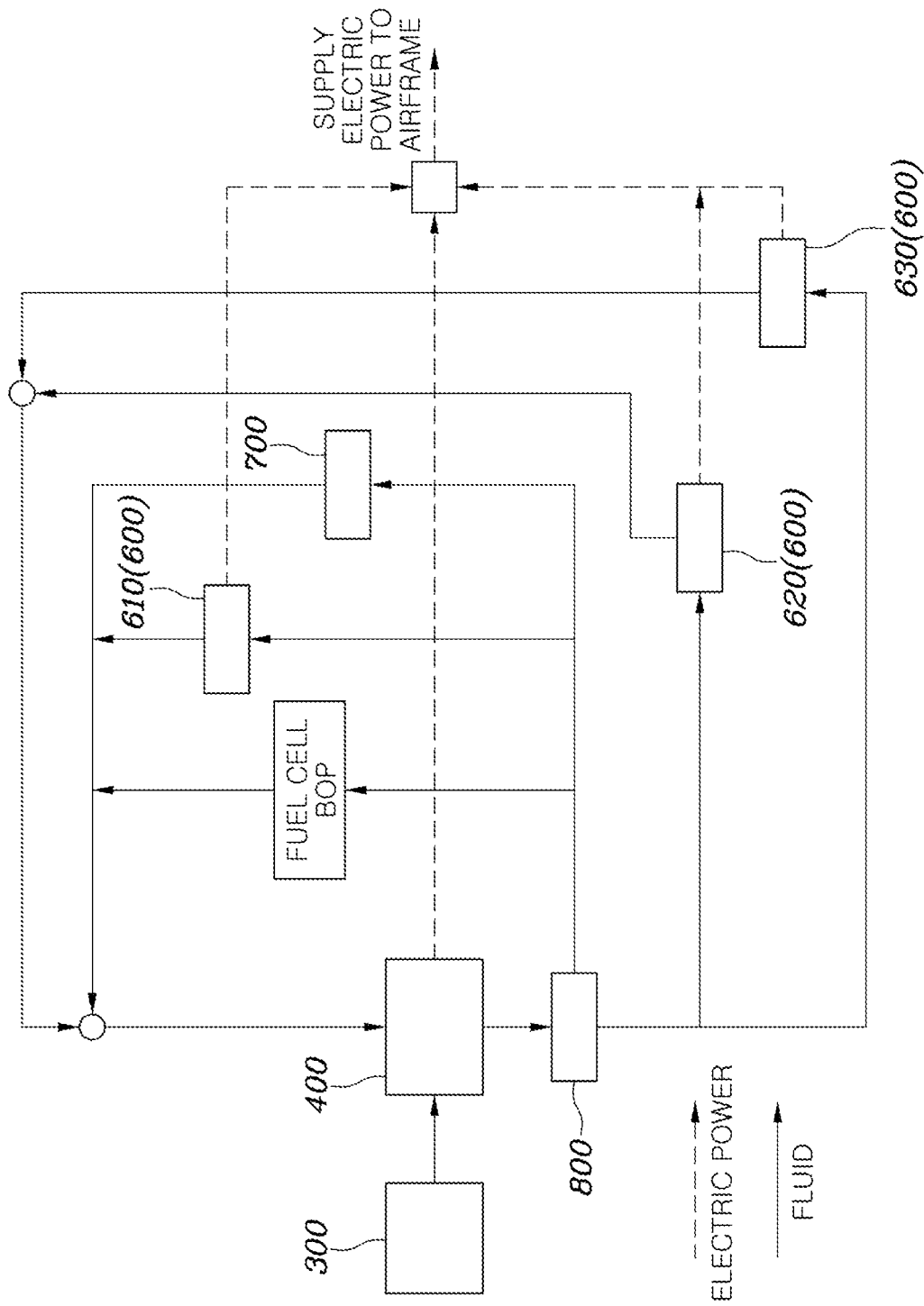
FIG. 3 is a block diagram for describing a supply of electric power and a fluid according to necessary electric power according to an exemplary embodiment.
Figure 4:
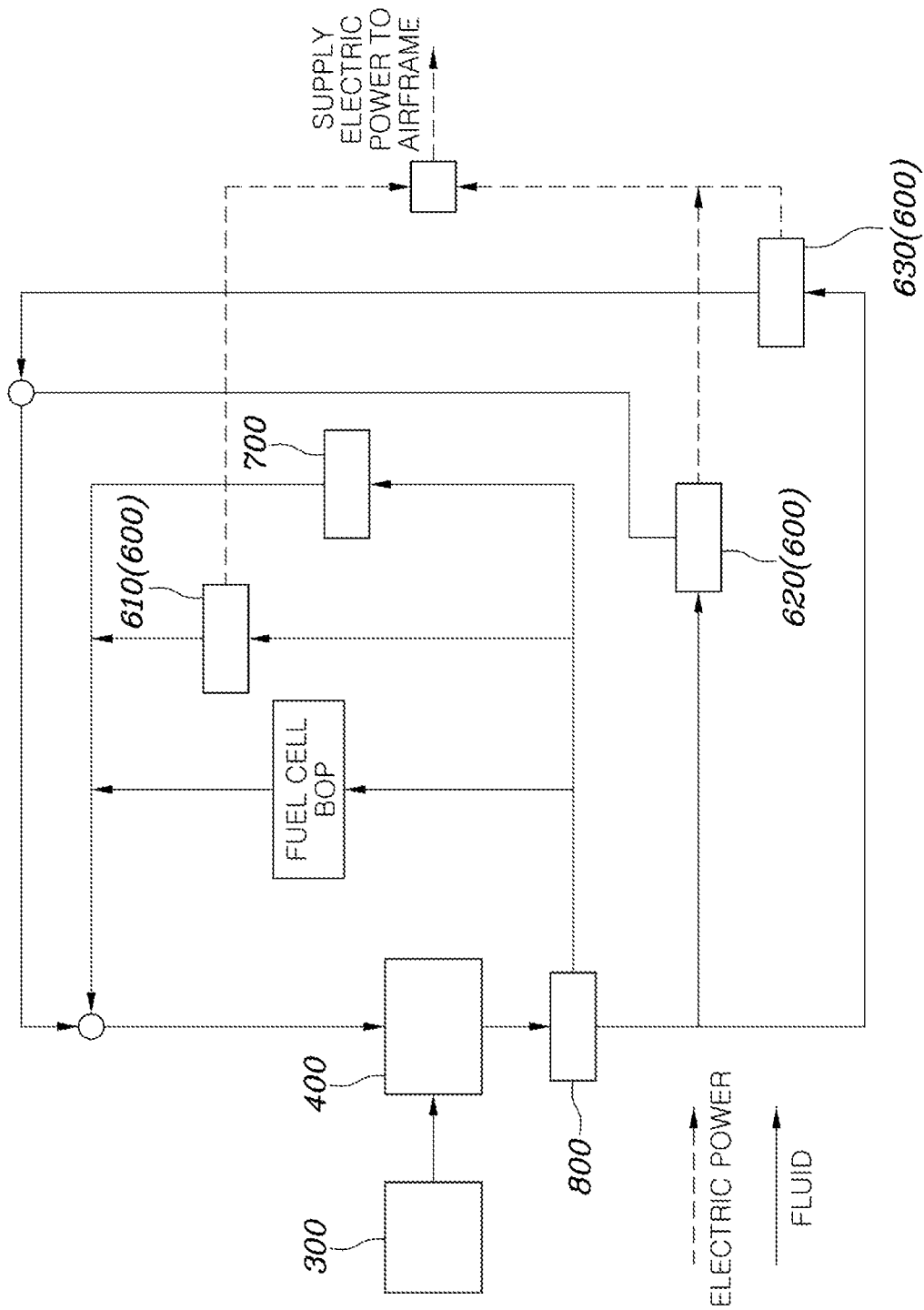
FIG. 4 is a block diagram for describing a supply of electric power and a fluid according to necessary electric power according to another exemplary embodiment.
Figure 5:
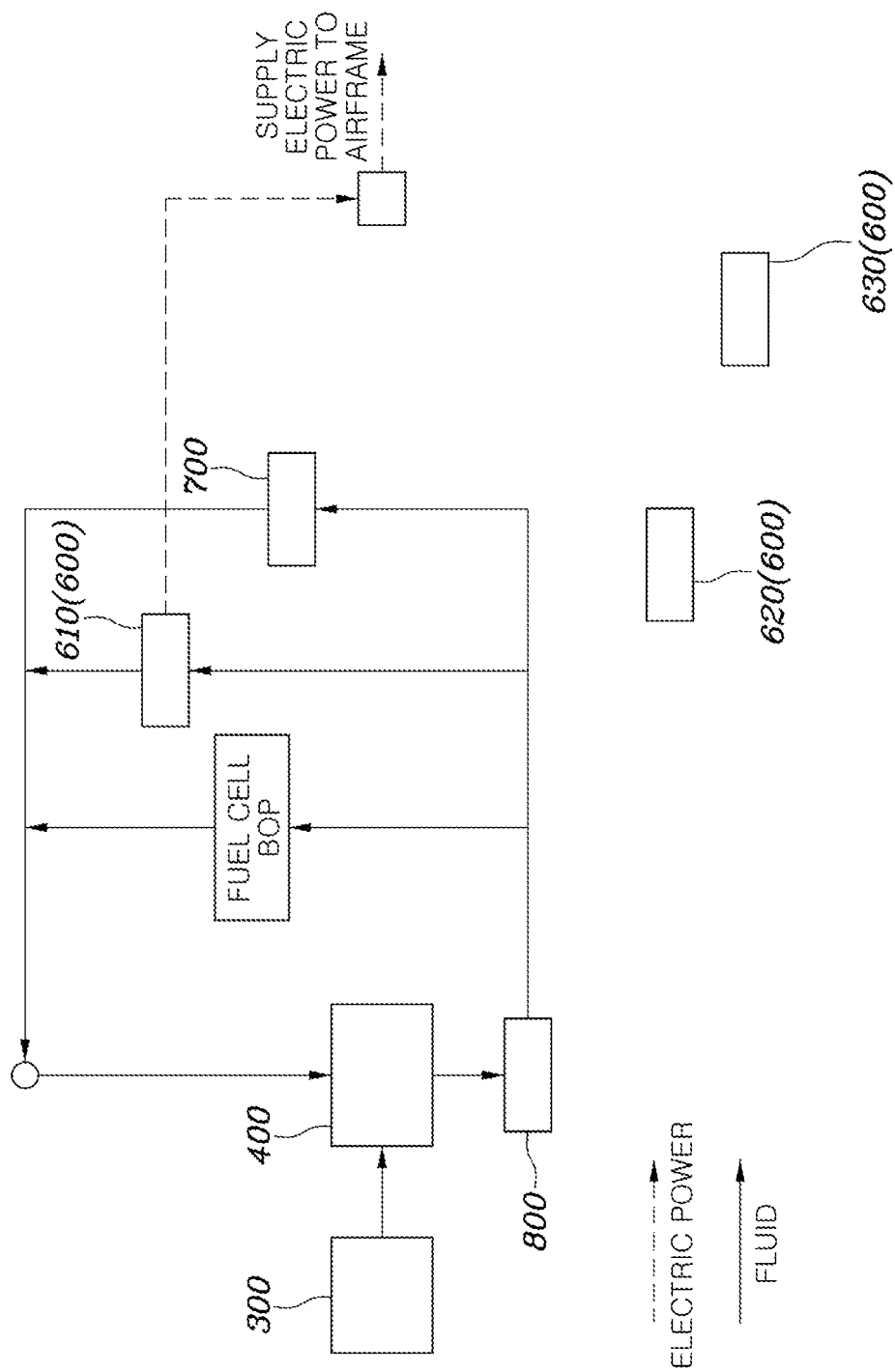
FIG. 5 is a block diagram for describing a supply of electric power and a fluid according to necessary electric power according to still another exemplary embodiment.
Figure 6:
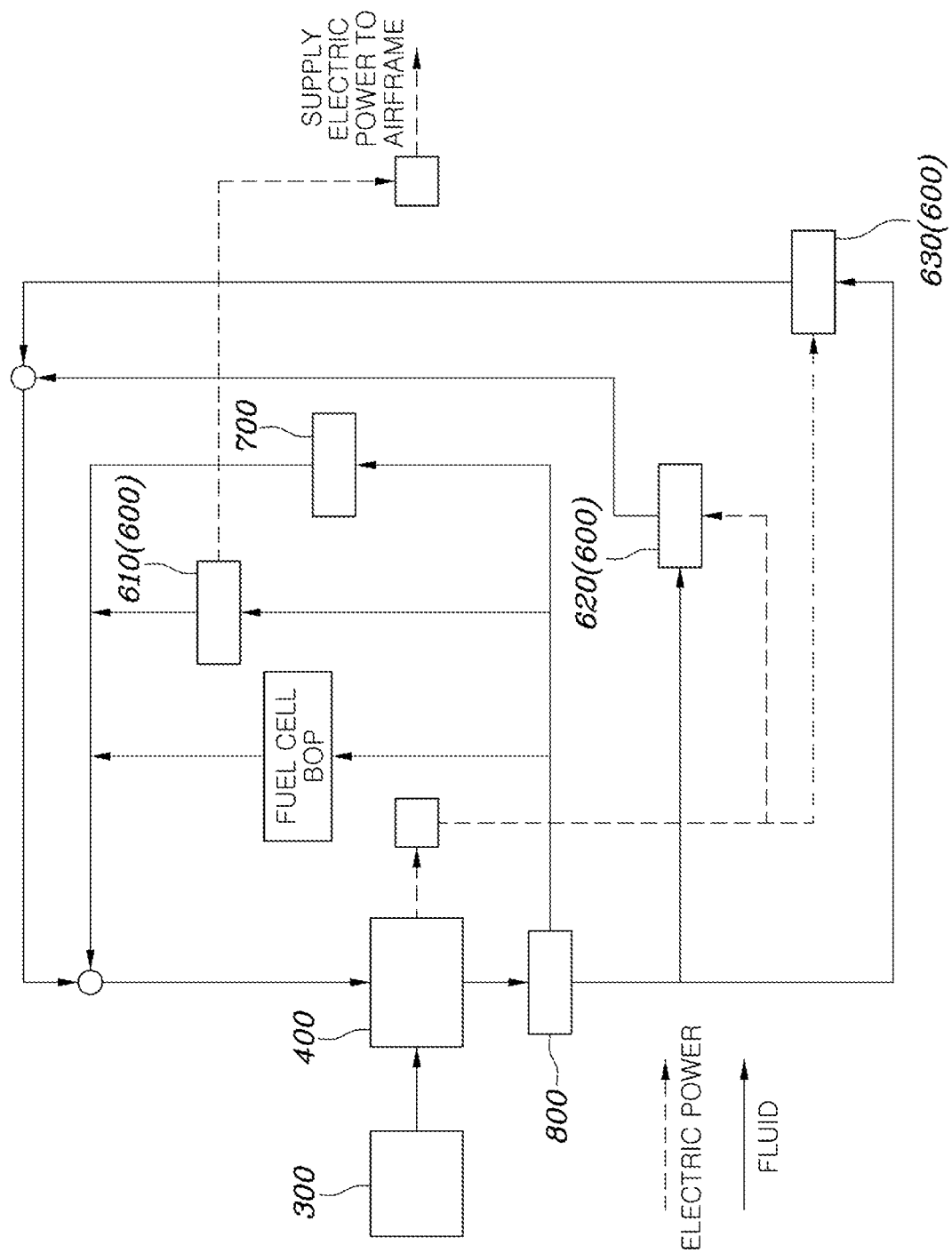
FIG. 6 is a block diagram for describing a supply of electric power and a fluid according to necessary electric power and charging according to an exemplary embodiment.
Figure 7:
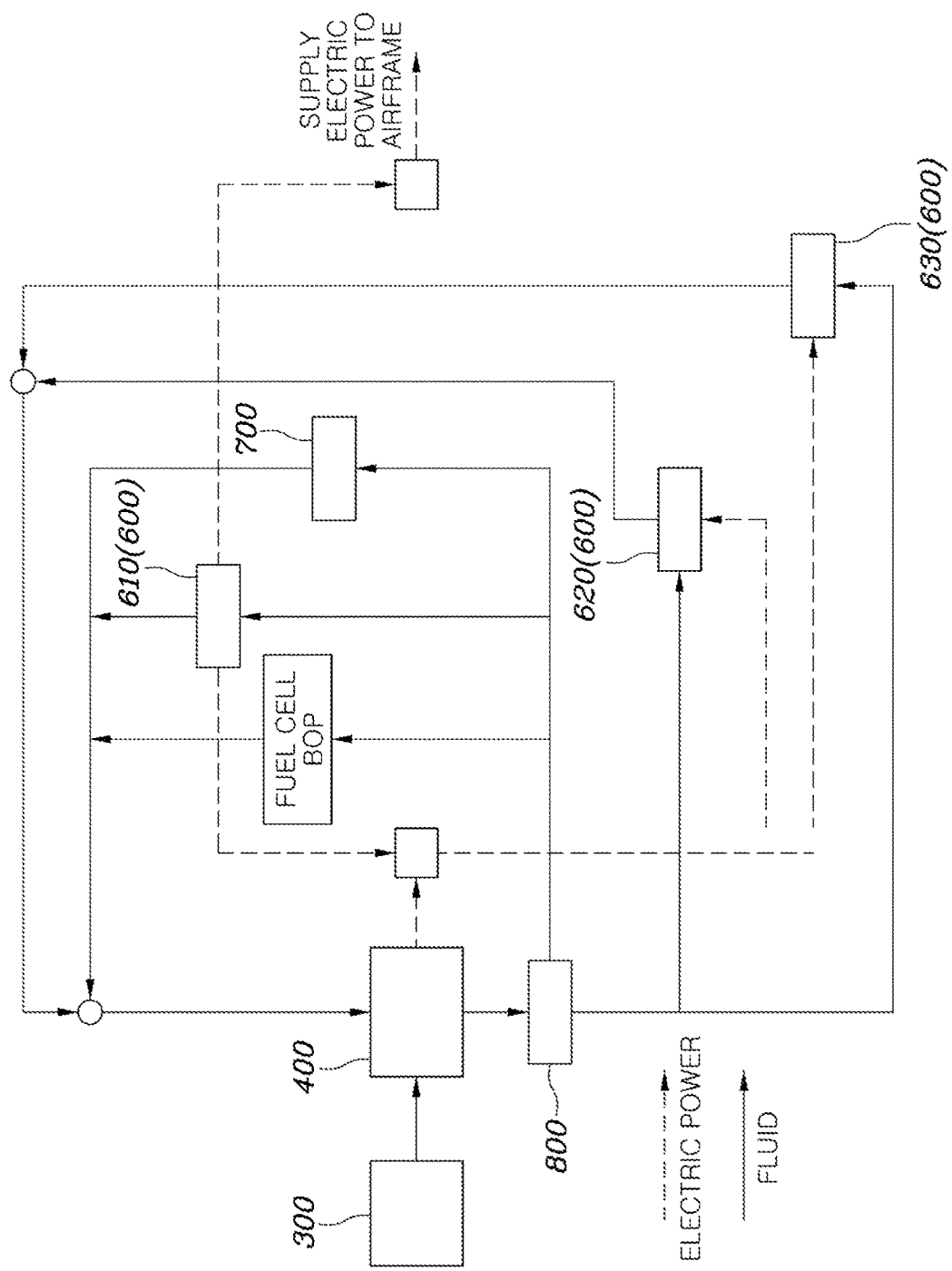
FIG. 7 is a block diagram for describing a supply of electric power and a fluid according to necessary electric power and charging according to another exemplary embodiment.

FIG. 1 is a diagram illustrating an electric power and thermal management system according to the present disclosure, FIG. 2 is a block diagram illustrating the electric power and thermal management system shown in FIG. 1, FIG. 3 is a block diagram for describing a supply of electric power and a fluid according to necessary electric power according to an exemplary embodiment, FIG. 4 is a block diagram for describing a supply of electric power and a fluid according to necessary electric power according to another exemplary embodiment, FIG. 5 is a block diagram for describing a supply of electric power and a fluid according to necessary electric power according to still another exemplary embodiment, FIG. 6 is a block diagram for describing a supply of electric power and a fluid according to necessary electric power and charging according to an exemplary embodiment, and FIG. 7 is a block diagram for describing a supply of electric power and a fluid according to necessary electric power and charging according to another exemplary embodiment.

As shown in FIGS. 1 and 2, the electric power and thermal management system according to the present disclosure includes a housing 100 in which a shaft 200 is provided in an inner space, a power part 300 connected to the shaft 200 and configured to transmit rotational power, a power generation part 400 configured to generate electric power through the rotation of the shaft 200 when the power part 300 is driven, a pumping mechanism 500 including an inclined plate 510 installed at the shaft 200 such that an inclined angle is adjusted, and a piston 520 configured to perform a reciprocating motion due to a rotation of the inclined plate 510, when the shaft 200 is rotated, and circulate a fluid, an electric power system part 600 to which the electric power generated in the power generation part 400 is supplied, and a drive system part 700 to which the fluid circulated by the pumping mechanism 500 is supplied.

Here, the housing 100 may be installed in various airframes and be provided with the shaft 200 rotatably installed therein. When describing the present disclosure, the airframe will be described as an example according to air mobility capable of flying.

The power part 300 is connected to the shaft 200 and, when the power part 300 is driven, rotational power is transmitted to the shaft 200 so that the shaft 200 is rotated. The power part 300 may be formed as a heat engine such as an internal combustion engine, a gas turbine engine, and a hydrogen combustion engine, and may be configured to supply the rotational power to the shaft 200.

The rotational power of the power part 300 may be transmitted to the shaft 200 through a gear engagement between the shaft 200 and the power part 300, and the shaft 200 may be connected to the power part 300 by a medium of a clutch mechanism 210. That is, when the clutch mechanism 210 is in a gear engagement state, the rotational power of the power part 300 is transmitted to the shaft 200 so that the power generation part 400 may be configured to generate electric power, and when the clutch mechanism 210 is in a gear disengagement state, even when the power part 300 is driven, the shaft 200 is not rotated. Since a speed reduction mechanism is included in the clutch mechanism 210, the power generation part 400 may be operated at an appropriate rotation speed capable of generating electric power due to the rotation of the shaft 200 as the power part 300 is driven.

The pumping mechanism 500 is connected to the shaft 200 together with the power generation part 400. Consequently, when the shaft 200 is rotated, the power generation part 400 and the pumping mechanism 500 may be configured to be driven together. In particular, the pumping mechanism 500 includes the inclined plate 510 inclinedly installed on the shaft 200 so as to allow an inclined angle to be adjusted, and the piston 520 may be configured to perform a reciprocating motion due to the inclined plate 510 rotated together with the shaft 200 to pump and circulate a fluid. That is, when the power part 300 is driven and thus the shaft 200 is rotated, the inclined plate 510 may be configured to be rotated together with the shaft 200. Since the inclined plate 510 is installed to have an inclination at the shaft 200, when the inclined plate 510 is rotated together with the shaft 200, the piston 520 connected to the inclined plate 510 may be configured to be reciprocated to pump the fluid.

In addition, since the inclined plate 510 is installed such that the inclined angle is adjusted, as the inclined angle of the inclined plate 510 is increased, a stroke of the piston 520 may be increased and thus a fluid circulation amount may be increased and, as the inclined angle of the inclined plate 510 may be decreased, the stroke of the piston 520 may be decreased and thus the fluid circulation amount may be decreased.

According to the present disclosure, through the above description, when the power part 300 is operated, since the shaft 200 is rotated to rotate the power generation part 400 and the inclined plate 510 of the pumping mechanism 500, electric power may be generated through the power generation part 400 and the piston 520 reciprocates due to the rotation of the inclined plate 510 to circulate the fluid.

Accordingly, the electric power generated in the power generation part 400 may be supplied to the electric power system part 600, and the fluid circulated by the pumping mechanism 500 may be circulated to the drive system part 700.

Here, the electric power system part 600 includes a fuel cell stack 610, a battery 620, and a supercapacitor 630 and may further include a fuel cell Balance Of Plant (BOP) and avionics equipment.

In addition, the drive system part 700 may be a device which is driven by a hydraulic pressure in the airframe and may include a landing gear and a wing angle adjusting device.

As described above, according to the present disclosure, when the power part 300 is operated, since the pumping mechanism 500 and the power generation part 400 are driven together with the rotation of the shaft 200, the generation of the electric power through the power generation part 400 and cooling and lubrication through fluid circulation due to the pumping mechanism 500 may be performed.

To describe the present disclosure in detail, as shown in FIG. 1, the housing 100 may be partitioned into a first space 110 in which the power part 300 and the shaft 200 are connected, a second space 120 which is connected to the first space 110 so as to allow the fluid to be circulated and in which the pumping mechanism 500 is provided, and a third space 130 which is connected to the second space 120 so as to allow the fluid to be circulated and in which the power generation part 400 is provided.

As described above, an interior of the housing 100 may be partitioned into the first space 110, the second space 120, and the third space 130, and the fluid may be circulated into each space. Accordingly, the first space 110, the second space 120, and the third space 130 may be each provided with an inlet and an outlet through which the fluid flows, respectively, and the second space 120 may be provided with the pumping mechanism 500 so that the fluid may be circulated into each space due to the operation of the pumping mechanism 500. Here, separate valves may be provided at the inlet and the outlet of the second space 120 to control the fluid to be smoothly circulated as the pumping mechanism 500 is operated.

That is, during the operation of the pumping mechanism 500 in the housing 100, the fluid flows from the second space 120 to the first space 110 to be supplied to a portion where the power part 300 and the shaft 200 are connected. Here, since the power part 300 and shaft 200 are connected by the medium of the clutch mechanism 210, the fluid is supplied to the clutch mechanism 210. In addition, a circulation structure of the fluid is formed such that, after flowing into an external heat exchanger 800, the drive system part 700, the electric power system part 600, which are provided at the outside of the housing 100 in the first space 110, the fluid may be circulated to the third space 130 and may be configured to cool a drive motor provided in the third space 130 to flow into the second space 120 again.

In addition, the housing 100 may be partitioned to exchange heat with the third space 130, and the housing 100 may be further provided with a fourth space 140 in which electrical equipment A is provided, and the electrical equipment A is cooled through heat exchange between the fluid circulating in the third space 130 and the electrical equipment A.

Here, the fourth space 140 may be formed such that the fluid does not flow, and heat exchange may be capable of being performed with the third space 130. To this end, a heat conduction member B made of a material with high heat transfer efficiency may be provided between the third space 130 and the fourth space 140, and the electrical equipment A may be installed to be in contact with the heat conduction member B in the fourth space 140 to be smoothly cooled by performing heat exchange with the fluid in the third space 130.

Meanwhile, the circulation path of the fluid due to the pumping mechanism 500 may include a connection portion between the power part 300 and the shaft 200, the external heat exchanger 800, the drive system part 700, the electric power system part 600, and the power generation part 400.

Here, the external heat exchanger 800 may be formed such that the fluid circulating in the housing 100 flows and is cooled through heat exchange with external air in the outside of the housing 100.

The drive system part 700 is a device which is driven by a hydraulic pressure in the airframe and may include a landing gear and a wing angle adjusting device.

The electric power system part 600 may include the fuel cell stack 610, the battery 620, and the supercapacitor 630 and may further include the fuel cell BOP and avionics equipment.

The above-described electrical equipment A may include a controller 900, and an inverter may also be included in the electrical equipment A.

That is, as can be seen in FIG. 1, the fluid flowing due to the pumping mechanism 500 may be circulated to the clutch mechanism 210 of the first space 110 of the housing 100, the external heat exchanger 800, the drive system part 700, the electric power system part 600, the power generation part 400 of the third space 130, and the pumping mechanism 500 of the second space 120. Here, the circulation path of the fluid due to the pumping mechanism 500 may be provided with a check valve C which selectively allows the circulation of the fluid to the drive system part 700 and the electric power system part 600.

Accordingly, the fluid may be configured to flow into the first space 110 due to the operation of the pumping mechanism 500 to cool and lubricate the clutch mechanism 210, may be cooled in the external heat exchanger 800, and may be supplied to the drive system part 700 and electric power system part 600 to perform an operation through the hydraulic pressure and cooling. On the other hand, since the fluid passing through the drive system part 700 and the electric power system part 600 is previously cooled in the external heat exchanger 800, the fluid may be configured to cool and lubricate the power generation part 400 of the third space 130 and may be recirculated to the second space 120 due to the operation of the pumping mechanism 500 of the second space 120.

As described above, according to the present disclosure, when the power part 300 is operated and thus the shaft 200 is rotated, the pumping mechanism 500 may be operated to circulate the fluid, and the power generation part 400 may be configured to generate the electric power.

On the other hand, according to the present disclosure, necessary electric power, which is required in the airframe, and a necessary fluid volume of the drive system part 700 and the electric power system part 600 may be determined and, according to the necessary electric power and the necessary fluid volume, the controller 900 for controlling the power part 300, an inclined angle of the inclined plate 510, a supply of the electric power and the fluid, which are transferred to the drive system part 700 and the electric power system part 600, may be further included.

The controller 900 may be configured to determine the necessary electric power according to a state of the airframe and may be configured to determine the necessary fluid volume according to a temperature of the drive system part 700 and the electric power system part 600 or a hydraulic pressure amount required in the drive system part 700.

That is, the controller 900 may be configured to receive information according to a control value of the airframe to determine required power of the power part 300. In addition, the controller 900 may be configured to receive information according to the temperature of the electric power system part 600 or the fluid volume required by the drive system part 700 to determine the inclined angle of the inclined plate 510 and correct the inclined angle of the inclined plate 510 according to the rotation speed of shaft 200, thereby circulating an appropriate fluid volume. Through the above description, the controller 900 may be configured to control a driving amount of the power part 300 and the inclined angle of the inclined plate 510 so that an appropriate amount of the fluid may be circulated and generation of the electric power through the power generation part 400 may be performed.

Meanwhile, the power part 300 may be connected to the shaft 200 by the medium of the clutch mechanism 210. Since a speed reduction mechanism is included in the clutch mechanism 210, the power generation part 400 may be operated at an appropriate rotation speed capable of generating electric power due to the rotation of the shaft 200 as the power part 300 is driven.

Through the above description, the controller 900 may be configured to control whether the clutch mechanism 210 is engaged and, when the driving of the pumping mechanism 500 or the power generation part 400 is required, the controller 900 may be configured to control the clutch mechanism 210 to be engaged, and, when the driving of the pumping mechanism 500 or the power generation part 400 is not required, the controller 900 may be configured to control the clutch mechanism 210 to be disengaged.

That is, in a situation in which the generation of the electric power through the power generation part 400 or the fluid circulation due to the pumping mechanism 500 is required, the controller 900 may be configured to control the clutch mechanism 210 to be engaged, thereby driving the power generation part 400 and the pumping mechanism 500 due to the rotation of the shaft 200 as the power part 300 is operated.

On the other hand, in a situation in which the generation of the electric power through the power generation part 400 and the fluid circulation due to the pumping mechanism 500 are not required, the controller 900 may be configured to control the clutch mechanism 210 to be disengaged, thereby preventing unnecessary drive loss from being generated.

Meanwhile, when the necessary fluid volume is generated in the drive system part 700 and the electric power system part 600, the controller 900 may be configured to derive the inclined angle of the inclined plate 510, satisfying the necessary fluid volume to control the inclined plate 510.

That is, when the necessary fluid volume is generated in the drive system part 700 and the electric power system part 600, the controller 900 may be configured to drive the power part 300 to rotate the shaft 200. Here, the controller 900 may be configured to derive an inclined angle of the inclined plate 510, satisfying the necessary fluid volume at the rotation speed as the power part 300 is driven, and may be configured to control the inclined angle of the inclined plate 510 as the derived inclined angle of the inclined plate 510 so that, when the pumping mechanism 500 is driven due to the rotation of the shaft 200, a fluid satisfying the necessary fluid volume may be circulated so that the drive system part 700 and the electric power system part 600 may be normalized.

On the other hand, the controller 900 may be configured to control the electric power generated in the power generation part 400 and the electric power of the electric power system part 600 to be selectively supplied to the airframe according to the necessary electric power required by the airframe.

Here, the necessary electric power may be electric power for driving various devices, including flight or traveling of the airframe, and the controller 900 may be configured to confirm the necessary electric power and may be configured to supply the electric power generated in the power generation part 400 and the electric power of the electric power system part 600 to the airframe so as to satisfy the necessary electric power.

In particular, according to the present disclosure, when the shaft 200 is rotated, the generation of the electric power and the fluid circulation may be simultaneously performed. Since the generation of the electric power is related to the rotation speed of shaft 200, and the fluid circulation is related to the rotation speed of shaft 200 and the inclined angle of the inclined plate 510, both of the generation of the electric power and the fluid circulation may be satisfied according to the inclined angle of the inclined plate 510.

To describe in detail the control of the controller 900 according to the necessary electric power, when the necessary electric power exceeds a predetermined range, the controller 900 may be configured to provide the electric power generated by the power generation part 400 and the electric power of the fuel cell stack 610, the battery 620, and the supercapacitor 630 constituting the electric power system part 600 to the airframe.

Here, the predetermined range of the electric power preset in the controller 900 may be set to a range in which the necessary electric power required by the airframe may be driven as the electric power of the electric power system part 600. Through the above description, the controller 900 may be configured to determine whether the necessary electric power is within the predetermined range or out of the predetermined range and may be configured to supply the electric power generated in the power generation part 400 and the electric power of the electric power system part 600 to the airframe.

Accordingly, as shown in FIG. 3, when the necessary electric power exceeds a predetermined range, the controller 900 may be configured to provide the electric power generated by the power generation part 400 and the electric power of the fuel cell stack 610, the battery 620, and the supercapacitor 630 constituting the electric power system part 600 to the airframe.

As described above, when the necessary electric power required in the airframe exceeds the predetermined range, since a supply amount of the electric power should be secured, the controller 900 may be configured to provide all the electric power generated in the power generation part 400 and the electric power of the fuel cell stack 610, the battery 620, and the supercapacitor 630 constituting the electric power system part 600 to the airframe. Consequently, the airframe satisfies the necessary electric power, and stable driving of the airframe may be performed.

In addition to the above description, as the necessary electric power exceeds the predetermined range, the controller 900 may be configured to derive a necessary fluid volume for cooling the electric power system part 600 together with the drive system part 700 and may be configured to derive the rotation speed of the shaft 200 and the inclined angle of the inclined plate 510 so as to satisfy the necessary fluid volume.

That is, when the necessary electric power exceeds the predetermined range, the electric power system part 600 including all of the fuel cell stack 610, the battery 620, and the supercapacitor 630 is driven, and thus heat is generated in each part. Accordingly, as the fluid should be circulated for cooling of the electric power system part 600, the necessary fluid volume may be increased.

Therefore, the controller 900 may be configured to derive the necessary fluid volume for cooling the drive system part 700 and the electric power system part 600 and may be configured to derive the inclined angle of the inclined plate 510 according to the rotation speed of the shaft 200 so that a circulation amount of the fluid satisfies the necessary fluid volume and thus lubrication and cooling may be normalized.

Meanwhile, as shown in FIG. 4, when the necessary electric power is within the predetermined range, the controller 900 may be configured to provide the electric power of the fuel cell stack 610, the battery 620, and the supercapacitor 630 constituting the electric power system part 600 to the airframe.

As described above, when the necessary electric power required by the airframe is within the predetermined range, the electric power of the fuel cell stack 610, the battery 620, and the supercapacitor 630 constituting the electric power system part 600 may satisfy the necessary electric power.

Therefore, the controller 900 may be configured to suspend the generation of the electric power due to the driving of the power generation part 400 with rotational power of the power part 300, and may be configured to allow the circulation of the fluid through the driving of the pumping mechanism 500 with the rotational power of the power part 300.

In addition, the controller 900 may be configured to provide the electric power of the fuel cell stack 610, battery 620, and supercapacitor 630 constituting the electric power system part 600 to the airframe so that the airframe is stably driven.

In this case, when the necessary electric power is within the predetermined range, the controller 900 may be configured to derive a necessary fluid volume for cooling the electric power system part 600 together with the drive system part 700 and may be configured to derive the rotation speed of the shaft 200 and the inclined angle of the inclined plate 510 so as to satisfy the necessary fluid volume so that lubrication and cooling of each part may be normalized through a smooth circulation of the fluid.

On the other hand, as shown in FIG. 5, when the necessary electric power is less than the predetermined range, the controller 900 may be configured to supply the electric power of any one or more of the fuel cell stack 610, the battery 620, and the supercapacitor 630 constituting the electric power system part 600 to the airframe and may be configured to supply the fluid to a moving part of the drive system part 700 and the electric power system part 600.

As described above, when the necessary electric power required by the airframe is less than the predetermined range, only the fuel cell stack 610 constituting the electric power system part 600 may satisfy the necessary electric power.

Therefore, the controller 900 may be configured to suspend the generation of the electric power due to the driving of the power generation part 400 with rotational power of the power part 300 and may be configured to allow the circulation of the fluid through the driving of the pumping mechanism 500 with the rotational power of the power part 300.

In addition, the controller 900 may be configured to provide the electric power of the fuel cell stack 610 constituting the electric power system part 600 to the airframe so that the airframe is stably driven.

In this case, when the necessary electric power of the controller 900 is less than the predetermined range, since only the fuel cell stack 610 is driven in the electric power system part 600, the controller 900 may be configured to reduce the necessary fluid volume for cooling the drive system part 700 and the electric power system part 600. Therefore, the controller 900 may be configured to derive the rotation speed of the shaft 200 and the inclined angle of the inclined plate 510 so as to satisfy the necessary fluid volume in a state in which the necessary electric power is less than the predetermined range, and thus lubrication and cooling of each part may be normalized through a smooth circulation of the fluid.

On the other hand, as shown in FIG. 6, when charging of the battery 620 and the supercapacitor 630 is required in the electric power system part 600, the controller 900 may be configured to supply the electric power generated in the power generation part 400 to the battery 620 and the supercapacitor 630.

Here, whether the battery 620 and the supercapacitor 630 are charged may be preset in the controller 900 according to a remaining amount of the electric power of the battery 620 and the supercapacitor 630.

That is, when the charging of the battery 620 and the supercapacitor 630 is required, the controller 900 may be configured to control the power generation part 400 to generate electric power due to the rotation of the shaft 200 as the power part 300 is operated, and may be configured to control the generated electric power to be charged in the battery 620 and the supercapacitor 630. In this case, when the necessary electric power is generated as the airframe is being driven, the electric power of the fuel cell stack 610 constituting the electric power system part 600 may be supplied to the airframe.

In addition, when the charging of the battery 620 and the supercapacitor 630 is required, the controller 900 may be configured to reduce the necessary electric power through control of reducing a traveling speed of the airframe or minimizing the use of the electrical equipment A, thereby stably driving the airframe and stabilizing the charging of the battery 620 and the supercapacitor 630.

Meanwhile, according to a charging amount or a charging speed of the battery 620 and the supercapacitor 630, the controller 900 may be configured to derive the driving amount of the power part 300 and the inclined angle of the inclined plate 510 to control the inclined plate 510 and the power part 300.

As described above, the controller 900 may be configured to control the driving amount of the power part 300 according to the charging amount or the charging speed of the battery 620 and the supercapacitor 630 constituting the electric power system part 600. That is, when the charging amount of the battery 620 and the supercapacitor 630 is large or the charging speed should be increased, the controller 900 may be configured to increase the driving amount of the power part 300 to increase a generation amount of the electric power of the power generation part 400. In addition, when the battery 620 and the supercapacitor 630 are charged, the controller 900 may be configured to control the power part 300 to operate with a preset driving amount.

However, when the driving of the power part 300 is increased, since the circulation amount of the fluid due to the pumping mechanism 500 is increased as the rotation speed of the shaft 200 is increased, the controller 900 may be configured to derive an inclined angle of the inclined plate 510 according to the necessary fluid volume to control the inclined angle of the inclined plate 510.

Therefore, according to the present disclosure, when the electric power of the battery 620 and the supercapacitor 630 constituting the electric power system part 600 is charged, through the control of the driving amount of the power part 300 and the inclined angle of the inclined plate 510, the necessary fluid volume required by the drive system part 700 and the electric power system part 600 may be supplied, and electric power required for charging through the power generation part 400 and the driving of the airframe may be secured.

Meanwhile, as shown in FIG. 7, when fast charging of the battery 620 and the supercapacitor 630 is required, the controller 900 may be configured to control the electric power of the fuel cell stack 610 constituting the electric power system part 600 to be supplied to the battery 620 and the supercapacitor 630.

That is, when the charging of the battery 620 and the supercapacitor 630 is required, the controller 900 may be configured to control the power generation part 400 to generate electric power due to the rotation of the shaft 200 as the power part 300 is operated, and may be configured to allow the generated electric power to be charged in the battery 620 and the supercapacitor 630. In addition, the electric power of the fuel cell stack 610 may be controlled to be supplied to the battery 620 and the supercapacitor 630 so that the charging speed of the battery 620 and the supercapacitor 630 may be increased. In this case, when the necessary electric power is generated as the airframe is being driven, the electric power of the fuel cell stack 610 constituting the electric power system part 600 may be supplied to the airframe.

In addition, the controller 900 may be configured to derive the rotation speed of the shaft 200 and the inclined angle of the inclined plate 510 so as to satisfy a fluid volume required for cooling the drive system part 700 and the electric power system part 600 so that lubrication and cooling of each part may be normalized through a smooth circulation of the fluid.

In the electric power and thermal management system having the above-described structure, when the shaft 200 is rotated due to the operation of the power part 300, the generation of the electric power and the circulation of the fluid may be performed together so that the generation of the electric power and a circulation structure of the fluid are integrated, and thus a layout may be reduced and a structure may be simplified.

In addition, in a state in which the generation of the electric power and the circulation structure of the fluid are integrated, the circulation amount of the fluid may be adjusted according to the angle of the inclined plate 510 constituting the pumping mechanism 500 so that an oversupply of the fluid to the parts through which the fluid is circulated may be prevented.

In an electric power and thermal management system having the above-described structure, when a shaft is rotated due to an operation of a power part, generation of electric power and a circulation of a fluid may be performed together so that the generation of the electric power and a circulation structure of oil are integrated, and thus a layout may be reduced, and a structure may be simplified.

In addition, in a state in which the generation of the electric power and the circulation structure of the oil are integrated, a circulation amount of the oil may be adjusted according to an angle of an inclined plate constituting a pumping mechanism so that an oversupply of the oil to parts through which the oil is circulated may be prevented.

Although the specific embodiments of the present disclosure have been described and illustrated, those skilled in the art will appreciate that various alternations and modifications are possible without departing from the technical spirit of the present disclosure provided in the appended claims.

What is claimed is:

1. An electric power and thermal management system, comprising:
    a housing provided with a shaft in an inner space thereof;
    a power part connected to the shaft and configured to transmit rotational power;
    a power generation part configured to generate electric power through a rotation of the shaft when the power part is driven;
    a pumping mechanism comprising:
        an inclined plate installed at the shaft such that an inclined angle thereof is adjusted; and
        a piston configured to:
            perform a reciprocating motion due to a rotation of the inclined plate when the shaft is rotated; and
            circulate a fluid;
    an electric power system part configured to receive the electric power generated in the power generation part;
    a drive system part configured to receive the fluid circulated due to the pumping mechanism; and
    a controller configured to:
        determine necessary electric power required in an airframe;
        determine a necessary fluid volume of the drive system part and the electric power system part; and
        control the power part, an inclined angle of the inclined plate, and a supply of the electric power and the fluid which are transferred to the drive system part and the electric power system part according to the necessary electric power and the necessary fluid volume.

2. The electric power and thermal management system of claim 1, wherein the housing is partitioned into:
    a first space in which the power part and the shaft are connected;
    a second space which is connected to the first space, configured to control the fluid to be circulated and in which the pumping mechanism is provided; and
    a third space which is connected to the second space, configured to control the fluid to be circulated and in which the power generation part is provided.

3. The electric power and thermal management system of claim 2, wherein the housing is further provided with a fourth space which:
    is partitioned to exchange heat with the third space;
    is provided with electrical equipment; and
    is configured to cool the electrical equipment through heat exchange between the fluid circulating in the third space and the electrical equipment.

4. The electric power and thermal management system of claim 1, wherein the pumping mechanism is configured to form a circulation path of the fluid, the circulation path comprising:
    the power part;
    a connector of the shaft;
    an external heat exchanger;
    the drive system part;
    the electric power system part; and
    the power generation part.

5. The electric power and thermal management system of claim 1, wherein:
    the power part is connected to the shaft by a medium of a clutch mechanism; and
    the controller is configured to control whether the clutch mechanism is engaged such that the controller is configured to:
        engage the clutch mechanism when driving of the pumping mechanism or the power generation part is required; and
        disengage the clutch mechanism when the driving of the pumping mechanism or the power generation part is not required.

6. The electric power and thermal management system of claim 1, wherein, when the necessary fluid volume is generated in the drive system part and the electric power system part, the controller is configured to derive the inclined angle of the inclined plate, satisfying the necessary fluid volume to control the inclined plate.

7. The electric power and thermal management system of claim 1, wherein:
    the electric power system part includes a fuel cell stack, a battery, and a supercapacitor; and the controller is configured to control:
  the electric power generated in the power generation part; and
  the electric power of the electric power system part supplied to the airframe, wherein the electric power of the electric power system part is selectively supplied according to the necessary electric power required by the airframe.

8. The electric power and thermal management system of claim 7, wherein, when the necessary electric power exceeds a predetermined range, the controller is configured to control the electric power generated by the power generation part and the electric power of the fuel cell stack, the battery, and the supercapacitor to be supplied to the airframe.

9. The electric power and thermal management system of claim 8, wherein, when the necessary electric power exceeds the predetermined range, the controller is configured to:
  derive the necessary fluid volume for cooling the electric power system part together with the drive system part; and
  derive a rotation speed of the shaft and the inclined angle of the inclined plate so as to satisfy the necessary fluid volume.

10. The electric power and thermal management system of claim 7, wherein, when the necessary electric power is within the predetermined range, the controller is configured to control the electric power of the fuel cell stack, the battery, and the supercapacitor to be supplied to the airframe.

11. The electric power and thermal management system of claim 7, wherein, when the necessary electric power is less than a predetermined range, the controller is configured to:
  control the electric power of any one or more of the fuel cell stack, the battery, and the supercapacitor to be supplied to the airframe; and
  control the fluid to be supplied to a moving part of the drive system part and the electric power system part.

12. The electric power and thermal management system of claim 7, wherein, when charging of the battery and the supercapacitor is required in the electric power system part, the controller is configured to control the electric power generated in the power generation part to be supplied to the battery and the supercapacitor.

13. The electric power and thermal management system of claim 12, wherein the controller is configured to derive a driving amount of the power part and the inclined angle of the inclined plate according to a charging amount or a charging speed of the battery and the supercapacitor to control the inclined plate and the power part.

14. The electric power and thermal management system of claim 12, wherein, when fast charging of the battery and supercapacitor is required, the controller is configured to control the electric power of the fuel cell stack to be supplied to the battery and the supercapacitor.

* * * * *